US010484550B2

(12) United States Patent
Kamata

(10) Patent No.: US 10,484,550 B2
(45) Date of Patent: Nov. 19, 2019

(54) DISPLAY CONTROL APPARATUS THAT DISPLAYS PREVIEW IMAGE, CONTROL METHOD THEREFOR, AND STORAGE MEDIUM

(71) Applicant: CANON KABUSHIKI KAISHA, Tokyo (JP)

(72) Inventor: Yutaro Kamata, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/226,760

(22) Filed: Dec. 20, 2018

(65) Prior Publication Data

US 2019/0199869 A1 Jun. 27, 2019

(30) Foreign Application Priority Data

Dec. 25, 2017 (JP) ................. 2017-248383

(51) Int. Cl.
*H04N 1/00* (2006.01)
*G06F 3/041* (2006.01)
*G06F 3/0488* (2013.01)

(52) U.S. Cl.
CPC ....... *H04N 1/00456* (2013.01); *G06F 3/0412* (2013.01); *G06F 3/0488* (2013.01); *H04N 1/00411* (2013.01); *H04N 1/00413* (2013.01); *H04N 2201/0094* (2013.01)

(58) Field of Classification Search
CPC .......... H04N 1/00456; H04N 1/00411; H04N 1/00413; H04N 2201/0094; G06F 3/0412; G06F 3/0488
See application file for complete search history.

(56) References Cited

U.S. PATENT DOCUMENTS

| 2011/0242601 A1* | 10/2011 | Takahashi | G06F 3/1205 358/1.15 |
| 2012/0293433 A1* | 11/2012 | Yamamoto | G06F 3/0412 345/173 |
| 2015/0169169 A1* | 6/2015 | Andersson | G06F 3/0488 715/765 |
| 2016/0162139 A1* | 6/2016 | Yoshizawa | G06F 3/0488 715/776 |
| 2017/0116706 A1* | 4/2017 | Chen | G06F 3/04842 |

FOREIGN PATENT DOCUMENTS

JP 2013077961 A 4/2013

* cited by examiner

*Primary Examiner* — Iriana Cruz
(74) *Attorney, Agent, or Firm* — Rossi, Kimms & McDowell LLP

(57) ABSTRACT

A display control apparatus which enables a user to easily determine positions of boundary lines in a preview image. A first image is generated based on an initial image or a processing result of first image processing performed on the initial image, and a second image is generated based on a processing result of second image processing performed on the initial image. Display of the preview image is controlled based on the first image and the second image. An operation performed by a user on a control point for determining a position of at least one boundary line in the preview image is received. In a display process for the preview image, at least a part of the first image and at least a part of the second image are displayed based on the boundary line the position of which is determined by the control point.

16 Claims, 21 Drawing Sheets

DISPLAY CONTROL APPARATUS THAT DISPLAYS PREVIEW IMAGE, CONTROL METHOD THEREFOR, AND STORAGE MEDIUM

BACKGROUND OF THE INVENTION

Field of the Invention

The present invention relates to a display control apparatus, a control method therefor, and a storage medium.

Description of the Related Art

An MFP which is a display control apparatus displaying a preview image is known. For example, the MFP performs image processing such as color correction and brightness adjustment on an image to be printed and displays a processing result image obtained as a result of the image processing as a preview image before starting printing (see, Japanese Laid-Open Patent Publication (Kokai) No. 2013-77961). This enables a user to see if effects achieved by the image processing line up with his or her intention before starting printing. To see the effect achieved by the image processing, for example, the user may compare an image before the image processing (hereafter referred to as an "initial image") with the processing result image. As a technique to easily compare the initial image with the processing result image, there has been proposed, for example, a technique that displays a composite image of the initial image and the processing result image as a preview image. The user is allowed to operate four control points placed at respective four corners of the preview image. Straight lines connecting the control points are used as boundary lines in the preview image. In the preview image, for example, one of areas split by the boundary lines is comprised of a part of the initial image, and the other one is comprised of a part of the processing result image. The user is able to see differences in detailed parts of the preview image before and after the image processing while changing the positions of the boundary lines.

However, when straight lines connecting control points are used as boundary lines in a preview image as described above, the plurality of control points needs to be operated so as to change positions of the boundary lines, which takes a lot of time and effort.

SUMMARY OF THE INVENTION

The present invention provides a display control apparatus and a control method therefor which enable a user to easily determine positions of boundary lines in a preview image, as well as a storage medium.

Accordingly, the present invention provides a display control apparatus that displays a preview image based on processing results of image processing performed on an initial image, comprising a first image generating unit configured to generate a first image based on the initial image or a processing result of first image processing performed on the initial image, a second image generating unit configured to generate a second image based on a processing result of second image processing performed on the initial image, a display control unit configured to control display of the preview image based on the first image and the second image; and a receiving unit configured to receive an operation performed by a user on a control point for determining a position of at least one boundary line in the preview image, wherein the display control unit controls a display process for the preview image, in which at least a part of the first image and at least a part of the second image are displayed based on the boundary line the position of which is determined by the control point.

The present invention enables the user to easily determine boundary lines in a preview image.

Further features of the present invention will become apparent from the following description of exemplary embodiments (with reference to the attached drawings).

DESCRIPTION OF THE EMBODIMENTS

Embodiments of the present invention will now be described in detail with reference to the accompanying drawings. First, a description will be given of a first embodiment of the present invention.

Figure 1:
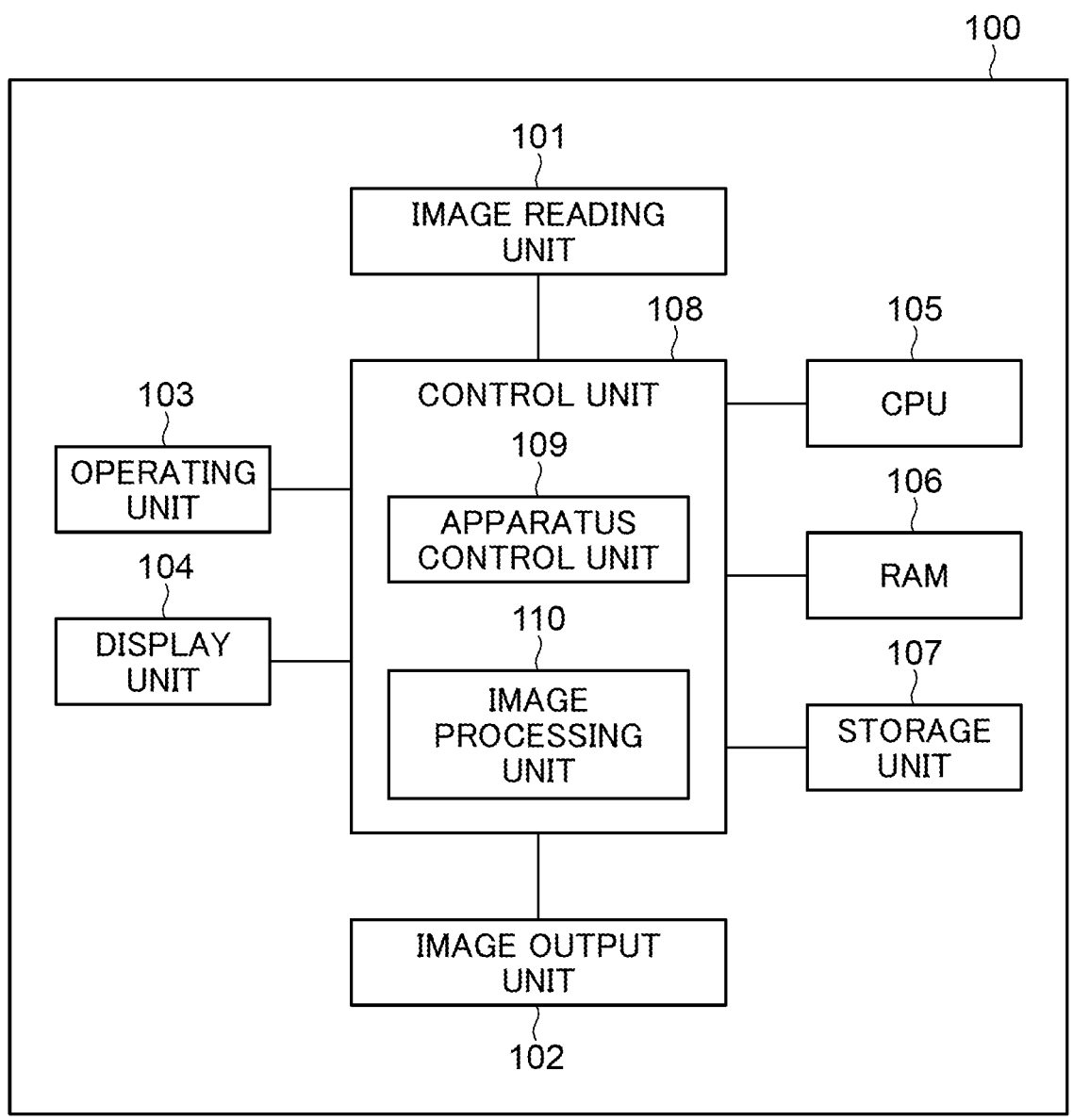
FIG. 1 is a block diagram schematically showing an arrangement of an MFP which is a display control apparatus according to a first embodiment of the present invention.

FIG. 1 is a block diagram schematically showing an arrangement of an MFP 100 which is a display control apparatus according to the first embodiment of the present invention. Referring to FIG. 1, the MFP 100 has an image reading unit 101, an image output unit 102, an operating unit 103, a display unit 104, a CPU 105, a RAM 106, a storage unit 107, and a control unit 108. The control unit 108 is connected to the image reading unit 101, the image output unit 102, the operating unit 103, the display unit 104, the CPU 105, the RAM 106, and the storage unit 107. The control unit 108 also has an apparatus control unit 109 and an image processing unit 110.

The MFP 100 is a multifunction printer equipped with a plurality of functions such as a copying function and a scanning function. The MFP 100 subjects an initial image to different types of image processing such as color correction and brightness adjustment. The MFP 100 also performs image processing differing in parameters such as a correction amount for color correction. Further, the MFP 100 displays a preview image based on a result of image processing. The preview image is, for example, a composite image of an initial image and a processing result image, which is obtained by subjecting the initial image to image processing. The image reading unit 101 is comprised of, for example, a scanner. The image reading unit 101 reads an original such as a sheet document to generate a scan image in an image data format and transfers the generated scan image to the control unit 108. The transferred scan image is stored in the storage unit 107. The image output unit 102 is comprised of, for example, a printer. The image output unit 102 prints the scan image or the like obtained from the control unit 108 on a sheet. The image output unit 102 may be comprised of, for example, a network output device. The image output unit 102 comprised of the network output device sends an image, which is an output result, to an external apparatus, not shown, via a network.

The operating unit 103 and the display unit 104 constitute, for example, a touch display in which the operating unit 103 which is a touch panel is layered on the top of the display unit 104 which is a display. Information on a user operation received by the operating unit 103 is transferred to the control unit 108 and reflected on an operation of the MFP 100 by the apparatus control unit 109. Also, what is displayed on the display unit 104 is changed according to the operational information on the user operation received by the operating unit 103. To change what is displayed on the display unit 104, the image processing unit 110 generates display data and transfers the display data to the display unit 104. The display data is, for example, the preview image mentioned above. The display unit 104 displays the received display data. It should be noted that in the present embodiment, the operating unit 104 and the display unit 104 should not always constitute the touch display, but the operating unit 103 may be a mouse, a keyboard, operating buttons, and so forth, and the display unit 104 may be a display that only produces displays.

The CPU 105 reads a main program from the storage unit 107 in accordance with an initial program stored in the storage unit 107 and stores the main program in the RAM 106. The RAM 106 is used as a program storage area and also used as a work area. The control unit 108 integratedly controls the entire MFP 100. The image processing unit 110 is comprised of, for example, arithmetic circuits and programs for image processing. Upon obtaining at least one input image from the control unit 108 and receiving a request to perform image processing on the input image, the image processing unit 110 performs image processing on the input image. The image processing unit 110 then transfers a processing result image, which is a result of the image processing, to the control unit 108. Upon receiving the processing result image from the image processing unit 110, the control unit 108 stores the processing result image in the storage unit 107 or transfers the processing result image to the display unit 104.

Figure 2:
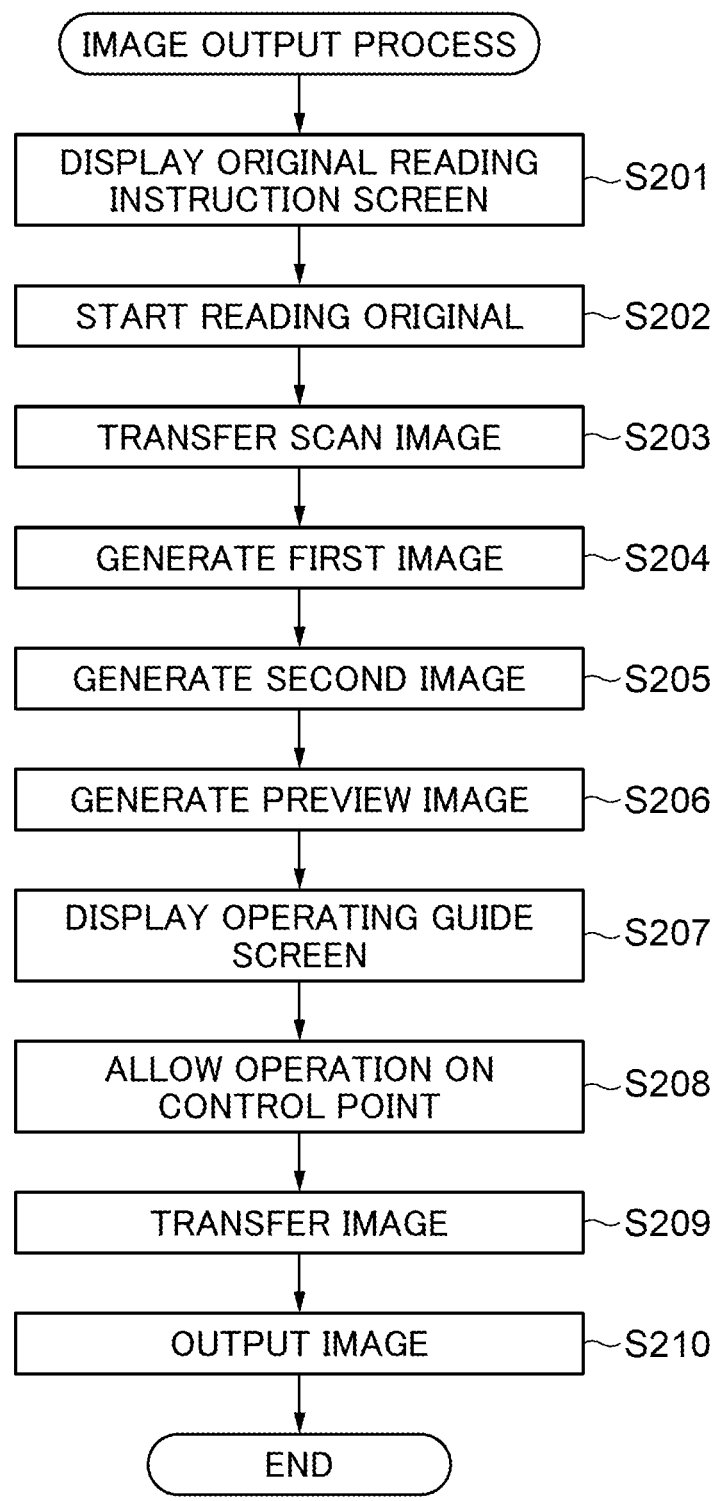
FIG. 2 is a flowchart showing the procedure of an image output process which is carried out by the MFP in FIG. 1.

FIG. 2 is a flowchart showing the procedure of an image output process which is carried out by the MFP 100 in FIG. 1. The process in FIG. 2 is implemented by the CPU 105 executing programs expanded from the storage unit 107 into the RAM 106. The process in FIG. 2 is carried out when the operating unit 103 receives a scanning preparation instruction given by the user.

Figure 3:
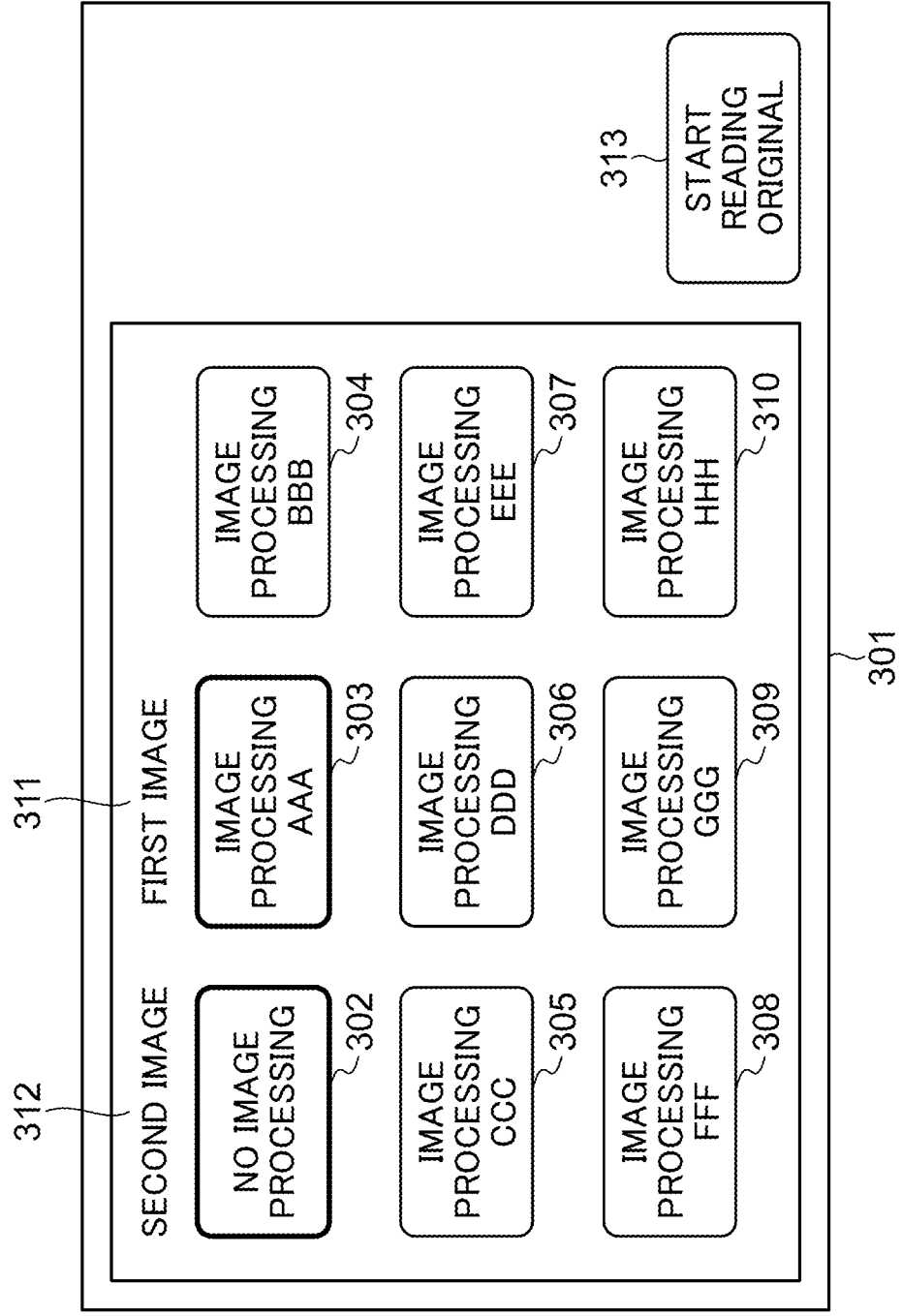
FIG. 3 is a view showing an example of an original reading instruction screen which is displayed on a display unit in FIG. 1.

Referring to FIG. 2, first, the CPU 105 causes the display unit 104 to display an original reading instruction screen 301 in FIG. 3 which is for issuing an instruction to start reading an original (step S201). The original reading instruction screen 301 has a no image processing button 302, at least one, for example, eight selection buttons 303 to 310, and a start button 313. When the no image processing button 302 is selected, a setting that will not perform image processing is made in the MFP 100. The selection buttons 303 to 310 correspond to different types of image processing with different parameters, and when any of the selection buttons 303 to 310 is selected, a setting that will perform image processing corresponding to the selected button is made in the MFP 100.

When the user selects one of the no image processing button 302 and the selection buttons 303 to 310 on the original reading instruction screen 301, the operating unit 103 receives this selection as a first image processing selecting operation. The operating unit 103 informs the control unit 108 to that effect and marks the selected button with a sign 311 indicating that the first image processing is selected. After that, when the user selects one of the no image processing button 302 and the selection buttons 303 to 310 except the button selected for the first image processing on the original reading instruction screen 301, the operating unit 103 receives this selection as a second image processing selecting operation. The operating unit 103 informs the control unit 108 to that effect and marks the selected button with a sign 312 indicating that the second image processing is selected. After that, when the start button 313 is selected on the original reading instruction screen 301, the operating unit 103 informs the control unit 108 that an original reading starting instruction has been received. When the start button 313 is selected with the first image processing or the second image processing unselected, the operating unit 103 automatically sets image processing corresponding to the first image processing or the second image processing from among the no image processing button 302 and the selection buttons 303 to 310.

Figure 4:
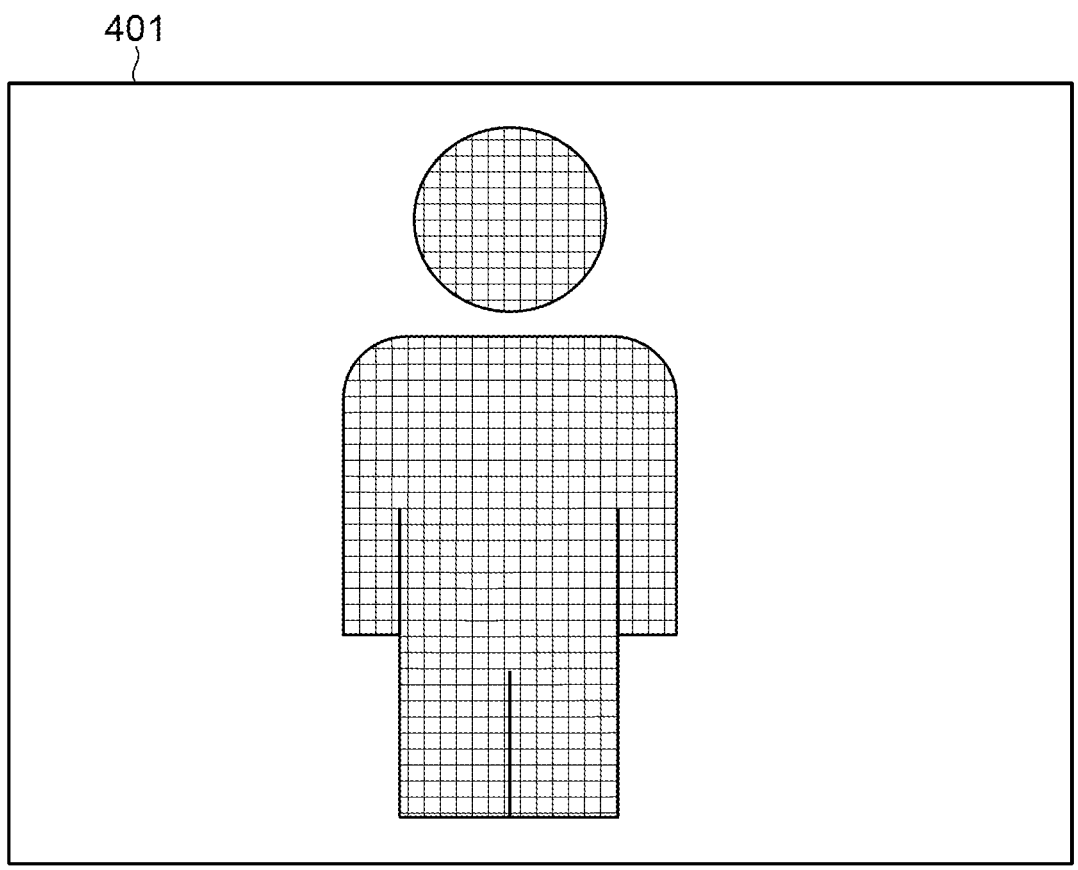
FIG. 4 is a view showing an example of a first image which is generated by the MFP in FIG. 1.

The CPU 105 then starts to read an original by causing the image reading unit 101 to operate (step S202). The image reading unit 101 reads the original to generate a scan image and stores the generated scan image in the storage unit 107. The CPU 105 then transfers the scan image stored in the storage unit 107 to the image processing unit 110 (step S203). The CPU 105 then generates a first image 401 in FIG. 4 by subjecting the scan image to processing corresponding to the button marked with the sign 311 (step S204). The first image 401 is stored in the storage unit 107. For example, when the button marked with the sign 311 is the no image processing button 302, the MFP 100 uses the scan image as it is as the first image 401 or makes a duplicate of the scan image to generate the first image 401. It should be noted that in the step S204, in preparation for the image processing corresponding to the button marked with the sign 311, the scan image may be subjected in advance to image processing such as noise removal and background removal described in the main program.

Figure 5:
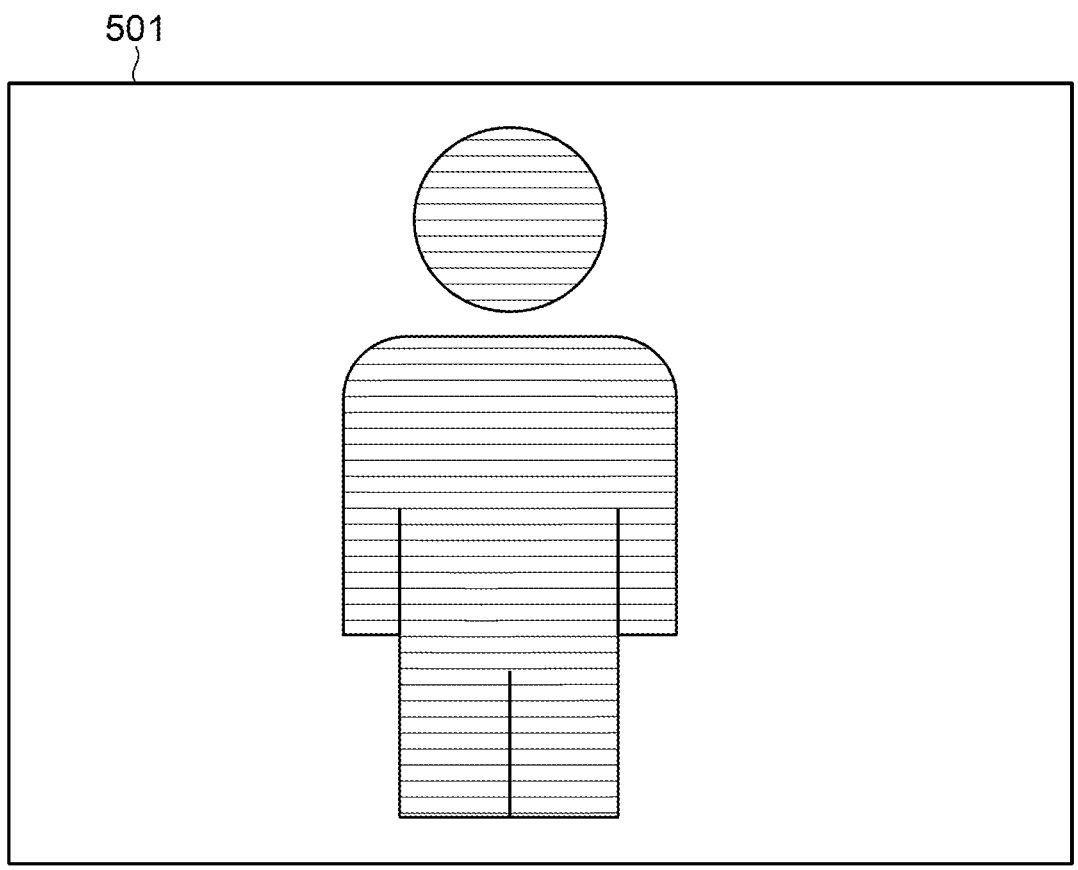
FIG. 5 is a view showing an example of a second image which is generated by the MFP in FIG. 1.

The CPU 105 then causes the image processing unit 110 to generate a second image 501 in FIG. 5 by performing processing corresponding to the button marked with the sign 312 (step S205). The second image 501 is also stored in the storage unit 107. For example, when the button marked with the sign 312 is the no image processing button 302, the MFP 100 uses the scan image as it is as the second image 501 or makes a duplicate of the scan image to generate the second image 501. It should be noted that in the Step S205, in preparation for the image processing corresponding to the button marked with the sign 312, the scan image may be subjected to image processing such as noise removal and background removal described in the main program as with the Step S204.

The CPU 105 then transfers the first image 104 and the second image 501 to the image processing unit 110. The CPU 105 causes the image processing unit 110 to generate a preview image 615 in FIG. 6 based on the first image 401 and the second image 501 (step S206). The preview image 615 is transferred to the display unit 104. The display unit 104 displays a preview screen 600 in FIG. 6 based on the preview image 615. The preview screen 600 has a display area 601, which displays the preview image 615, and selection buttons 613 and 614. When the selection button 613 is selected, a setting that will output the first image 401 is made in the MFP 100. When the selection button 614 is selected, a setting that will output the second image 501 is made in the MFP 100.

Figure 6:
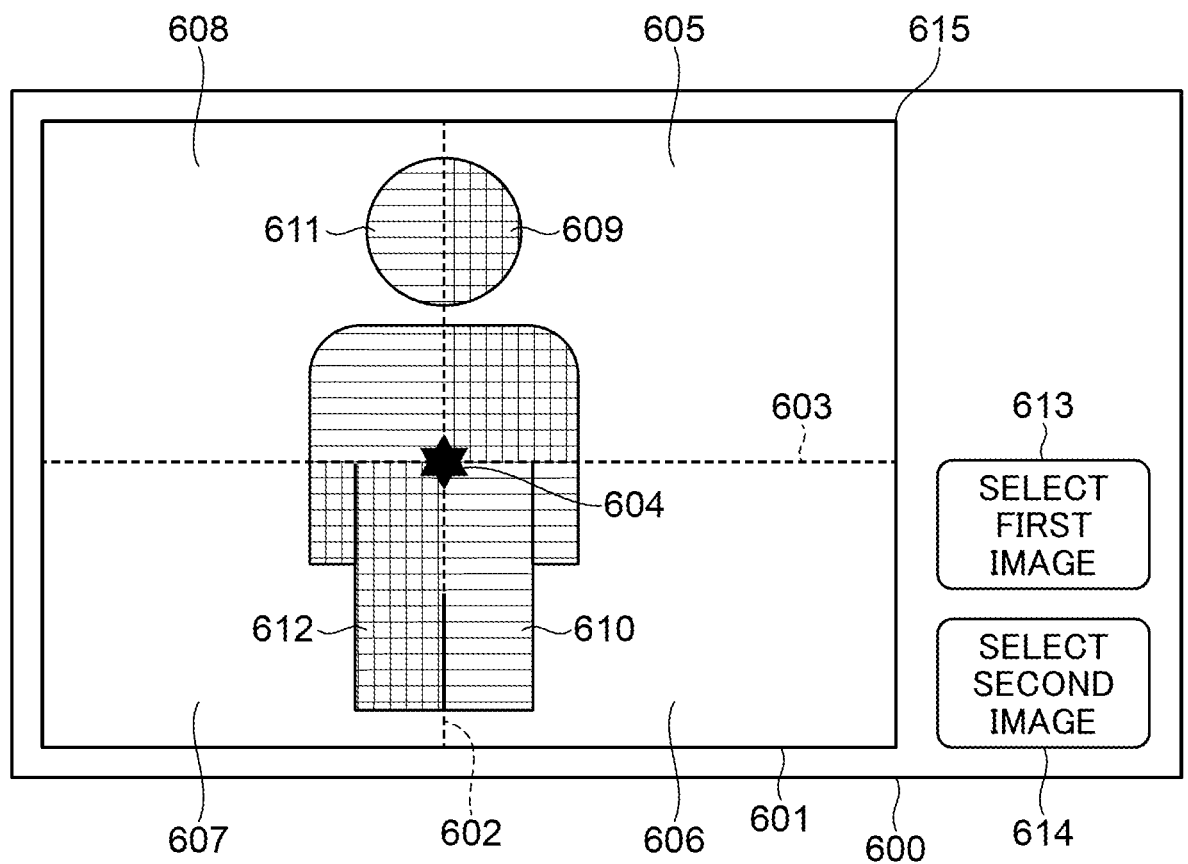
FIG. 6 is a view showing an example of a preview screen which is displayed on the display unit in FIG. 1.

The preview image 615 is a composite image of the first image 401 and the second image 501. One control point 604 for determining positions of a vertical boundary line 602 and a horizontal boundary line 603 is displayed in the display area 601 where the preview image 615 is displayed. It should be noted that in the present embodiment, a calibration of position coordinates of the preview image 615 and position coordinates of the control point 604 is performed in advance based on an initial position of the control point 604. The vertical boundary line 602 is a straight line along a vertical direction of the display area 601. The horizontal boundary line 603 is a straight line along a horizontal direction of the display area 601. The vertical boundary line 602 and the horizontal boundary line 603 are orthogonal to each other at the control point 604. The preview image 615 is divided into four split areas 605 to 608 by the vertical boundary line 602 and the horizontal boundary line 603 the positions of which are determined based on the control point 604. Either of the first image 401 and the second image 402 is assigned to each of the split areas 605 to 608, and different images are assigned to the adjacent split areas. In the preview image 615, the split areas 605 to 608 are comprised of partial images of images assigned to them. Specifically, as shown in FIG. 6, the split area 605 is comprised of a partial image 609 of the first image 401, and the split areas 606 and 608 adjacent to the split area 605 are comprised of partial images 610 and 611 of the second image 501. The split area 607 symmetric to the split area 605 about the control point 604 is comprised of a partial image 612 of the first image 401. The user can change the positions of the vertical boundary line 602 and the horizontal boundary line 603 by operating the control point 604 so that proportions of the split areas 605 to 608 in the preview image 615 can be changed, but at this point, the user is not allowed to operate the control point 604 by the MFP 100.

The CPU 105 then causes the image processing unit 110 to generate an operating guide screen for the control point 604 and display the operating guide screen on the display unit 104 (step S207). The operating guide screen may be, for example, an animation that moves the control point 604 in a predetermined direction. This animation is implemented by the control unit 108 moving the control point 604 in a predetermined direction in accordance with the main program and the image processing unit 110 updating a preview image in synchronization with the movement of the control point 604. When the movement of the control point 604 is ended, the CPU 105 carries out a process in Step S208, to be described later. The operating guide screen may also be a screen that uses characters and drawings to describe how to operate the control point 604. At this time, in response to an ending instruction given by the user, the CPU 105 ends the display of the operating guide screen and carries out the process in the step S208, to be described later. In the present embodiment, after the process in the step S206 is carried out, processes in Step S208, to be described later, and the subsequent steps may be carried out without carrying out a process in Step S207.

Then, the CPU 105 allows the user to operate the control point 604 on the preview screen 600 (step S208). This enables the user to operate the control point 604 displayed in the display area 601. In the present embodiment, a movable range of the control point 604 may be limited within the display area 601 and may include the whole preview screen 600, that is, an area other than the display area 601 so that the user can see all parts of the preview image 615. By moving the control point 604 within the movable range, the user is compares a first image processing result and a second image processing result in each area of the preview image 615 in detail.

Figure 7:
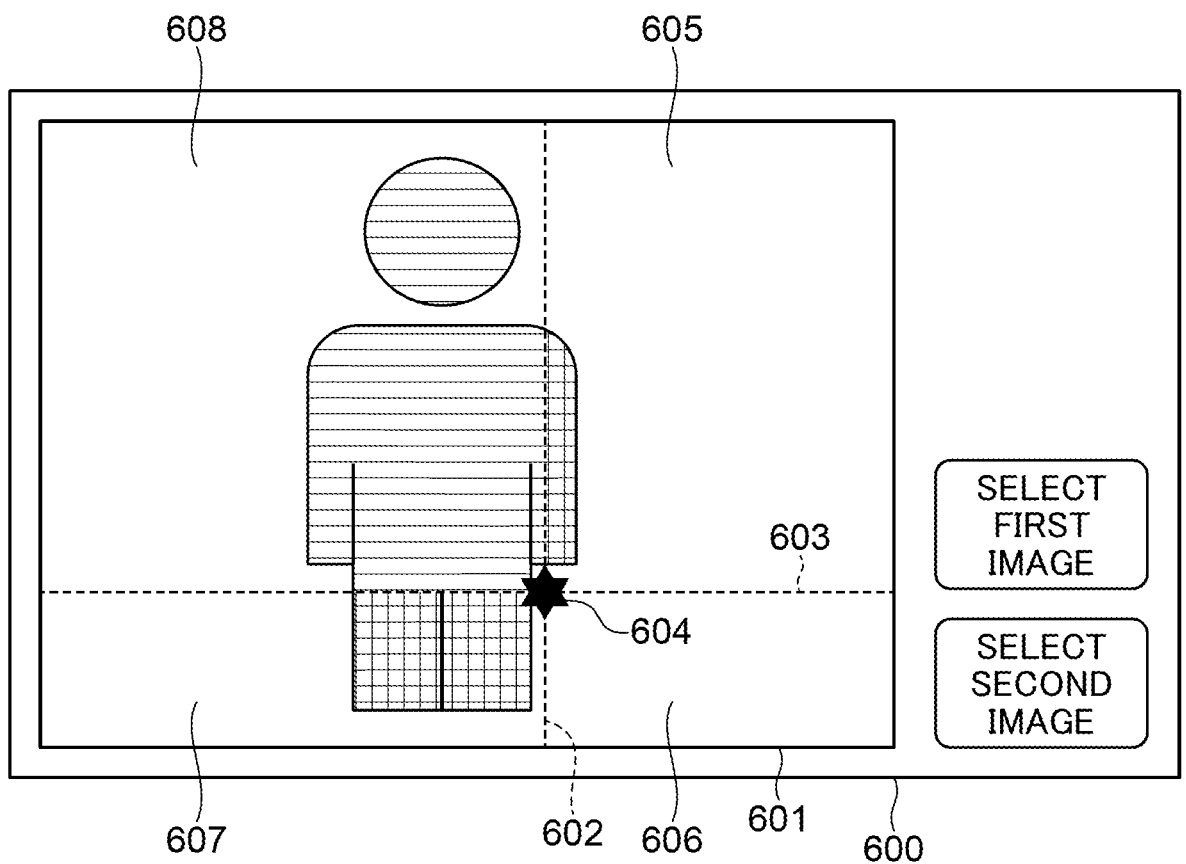
FIG. 7 is a view useful in explaining how the preview screen displayed on the display unit in FIG. 1 is updated.

A position to which the control point 604 will move is determined in response to an operation received by the operating unit 103. For example, the control point 604 moves in such a manner as to follow a sliding operation performed by the user or moves directly to a position at which a touch operation by the user has been detected. The vertical boundary line 602 and the horizontal boundary line 603 move in such a manner as to follow a moving direction of the control point 604 while they keep orthogonal to each other. For example, as the control point 604 moves from a position in FIG. 6 to a position in FIG. 7, the vertical boundary line 602 and the horizontal boundary line 603 also move. As the control point 604 moves, the proportions of the split areas 605 to 608 in the preview image 615 change. The CPU 105 causes the image processing unit 110 to recombine the first image 401 and the second image 501 together to update the partial images constituting the split areas 605 to 608 to partial images according to the above proportions. It should be noted that the first image 401 and the second image 501 are stored in the storage unit 107, but to speed up the recombination process, it is preferred that the first image 401 and the second image 501 are also stored in a computation area (not shown) readable at high speed by the image processing unit 110.

Figure 8:
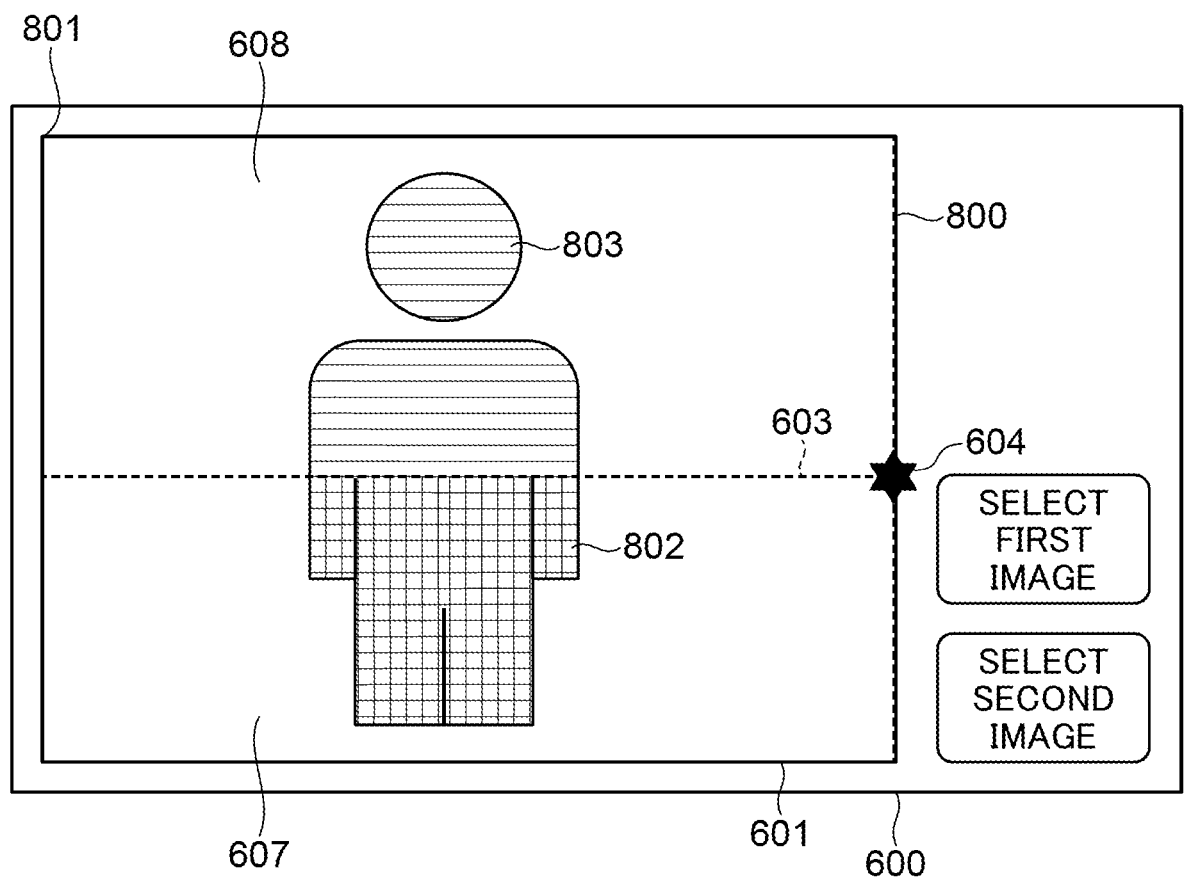
FIG. 8 is a view showing the preview screen in a case where a control point lies on a right side that forms a preview area.

On the preview screen 600, as the control point 604 becomes closer to a certain side among the four sides forming the preview image 615, the proportions of two of the four split areas 605 to 608 in the preview image 615 increase. Further, when the control point 604 moves onto the certain side, the preview image 615 is occupied by the two of the four split areas 605 to 608 and is divided into two sprit areas by either of the vertical boundary line 602 and the horizontal boundary line 603. For example, when the control point 604 moves onto a right side 800 in FIG. 8, a preview image 801 divided into the split areas 607 and 608 by the horizontal boundary line 603 is displayed in the display area 601. The split area 607 to which the first image 401 is assigned is comprised of a partial image 802 of the first image 401, and the split area 608 to which the second image 501 is assigned is comprised of a partial image 803 of the second image 501.

Moreover, on the preview screen 600, when the control point 604 is moved from one side onto a side opposite to the one side as a result of an operation performed by the user, partial images constituting the above two split areas of the preview image are switched. For example, when the control point 604 moves from a lower side 900 in FIG. 9 to an upper side 1000 in FIG. 10, the split areas 608 and 605 of a preview image 901 are switched to the split areas 607 and 606 lying next to each other across the horizontal boundary line 603. Since an image different from an image assigned to the split area 608 is assigned to the split area 607, and an image different from an image assigned to the split area 605 is assigned to the split area 606, partial images in the respective split areas of the preview image 901 are switched to those of a preview image 1001. By thus simply moving the control point 604 to an opposite side, the user easily switches partial images of respective split areas of the preview image 615.

Figure 11:
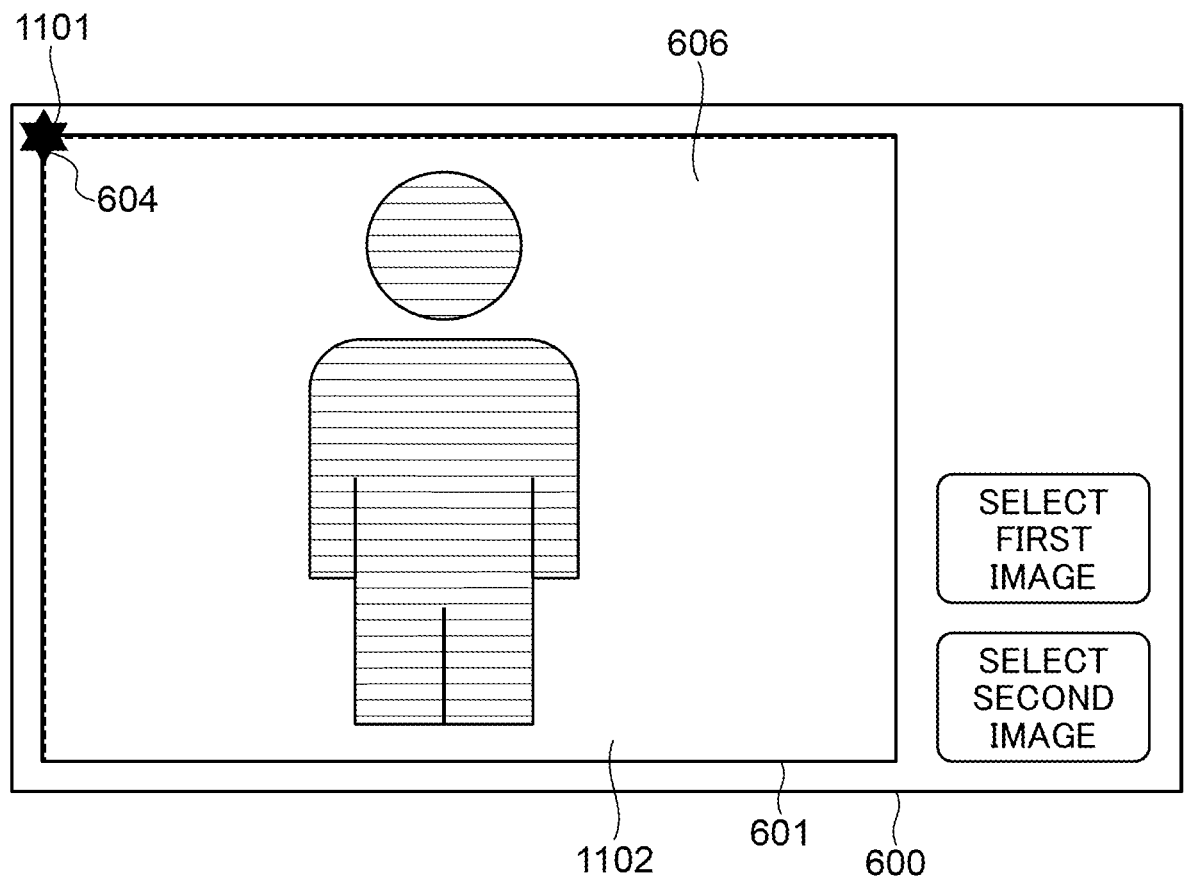
FIG. 11 is a view showing the preview screen in a case where the control point lies on an upper left corner that forms the preview area.
Figure 12:
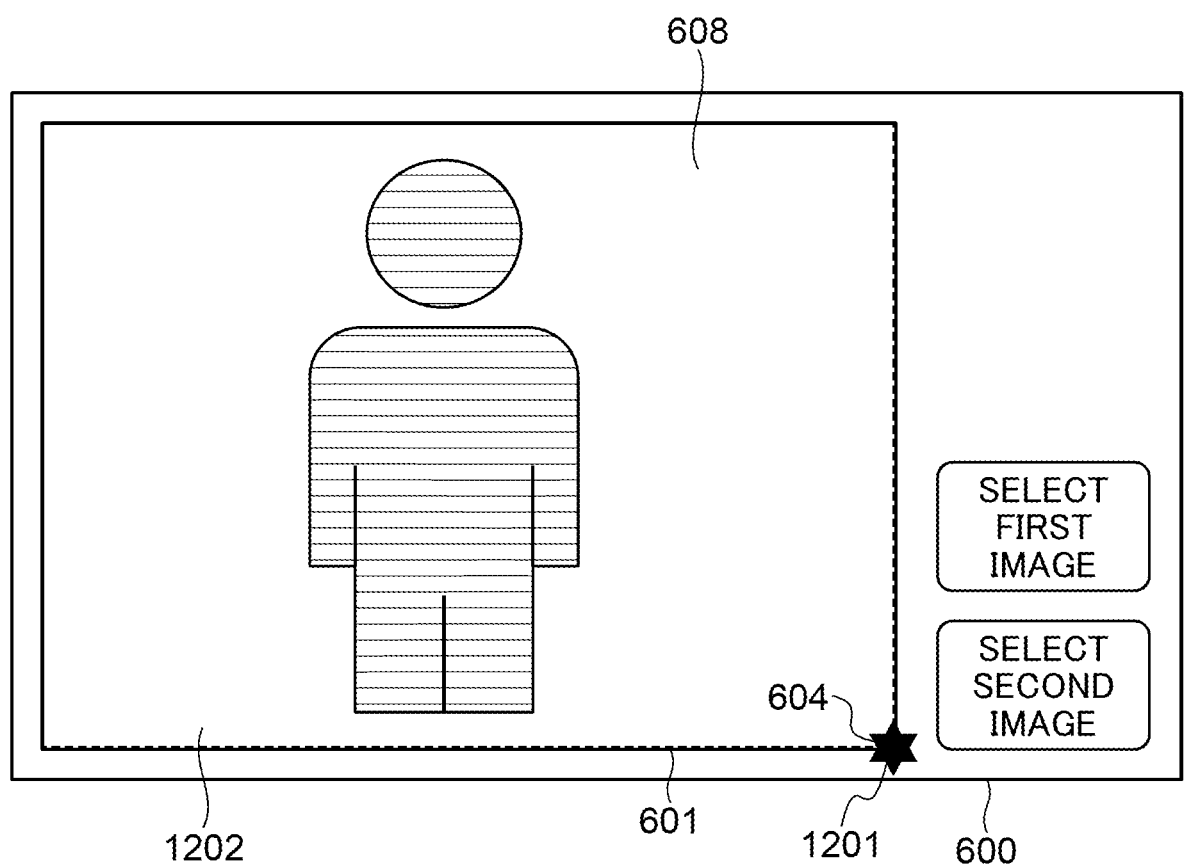
FIG. 12 is a view showing the preview screen in a case where the control point lies on a lower right corner that forms the preview area.
Figure 13:
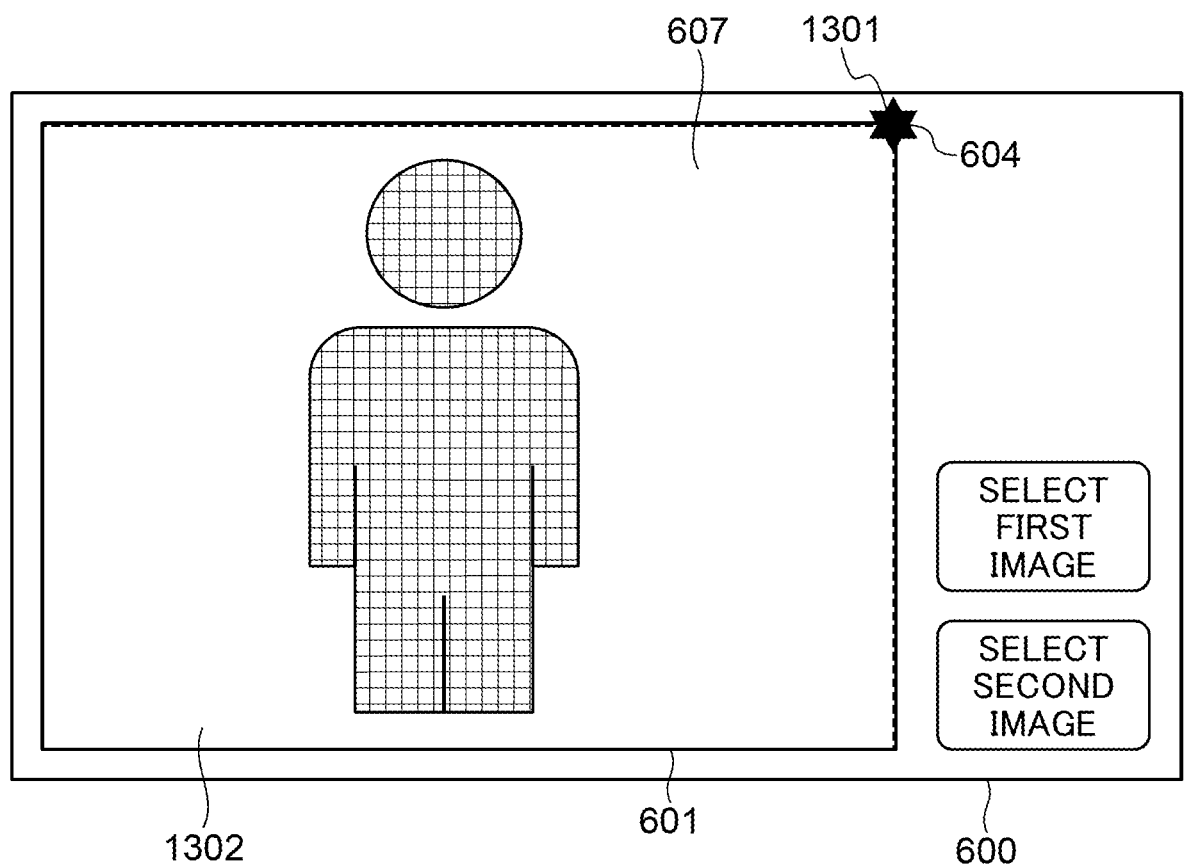
FIG. 13 is a view showing the preview screen in a case where the control point lies on an upper right corner that forms the preview area.
Figure 14:
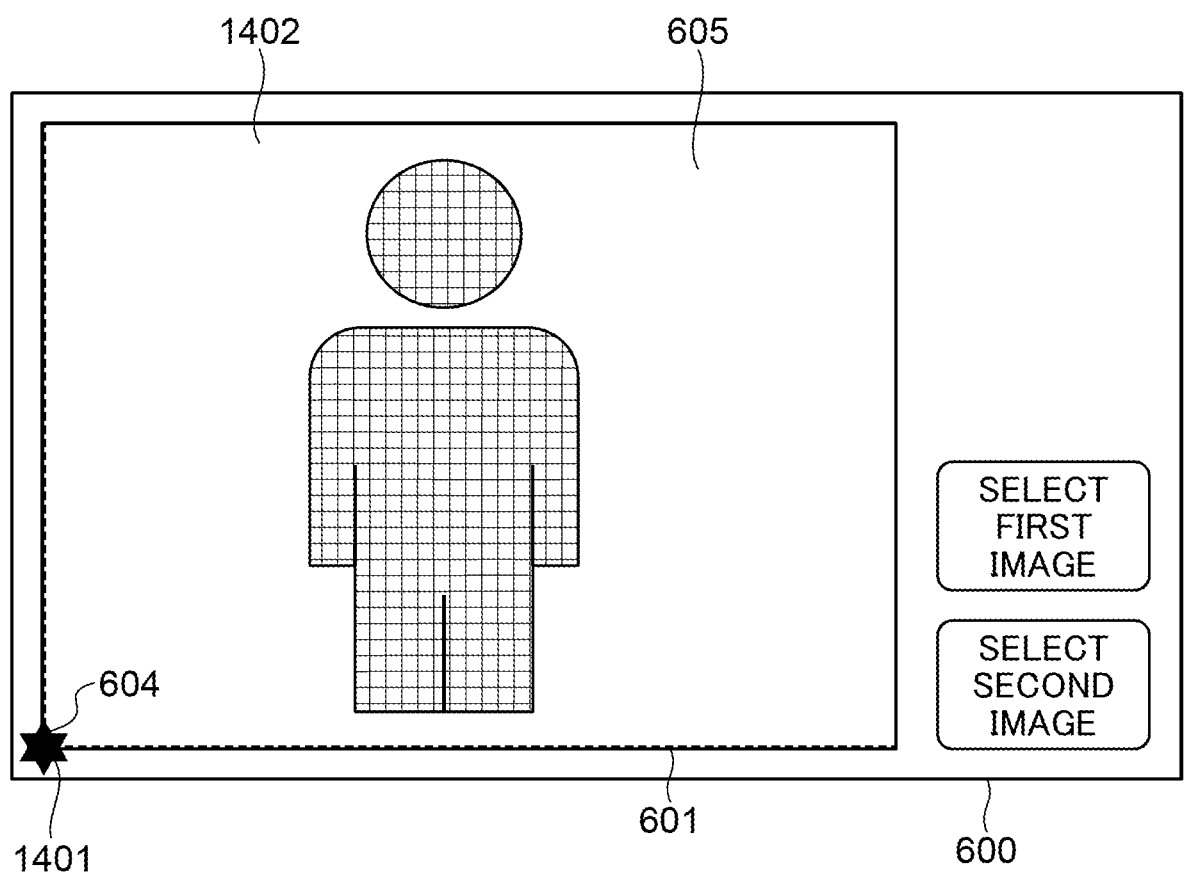
FIG. 14 is a view showing the preview screen in a case where the control point lies on a lower left corner that forms the preview area.

Furthermore, when the control point 604 is moved to one of four corners forming the preview mage, the preview image is occupied by one of the split areas 605 to 608. For example, when the control point 604 lies on an upper left corner 1101 in FIG. 11, the preview image is occupied by the split area 606 to which the second image 501 is assigned. As a result, a preview image 1102 comprised of the second image 501 is displayed in the display area 601. When the control point 604 is moved from the upper left corner 1101 of the display area 601 to a lower right corner 1201 in FIG. 12 which does not share any side with the upper left corner 1101, a preview image 1202 in the split area 608 to which the same image as the one assigned to the split area 606 is assigned is displayed on the display unit 104. On the other hand, when the control point 604 is moved from the upper left corner 1101 to an upper right corner 1301 in FIG. 13 or a lower left corner 1401 in FIG. 14 which shares a side forming the preview image area with the upper left corner 1101, a preview image 1302 or 1402 in the split area 607 or 605 to which an image different from as the one assigned to the split area 606 is assigned is displayed on the display unit 104.

After that, when the selection button 613 or 614 is selected on the preview screen 600, the CPU 105 transfers an image corresponding to the selected button to the image output unit 102 (step S209). The CPU 105 then causes the image output unit 102 to output the transferred image (Step S210) and ends the present process.

According to the first embodiment described above, a display process for a preview image is controlled in which at least a part of the first image 401 and at least a part of the second image 501 are displayed based on the vertical boundary line 602 and the horizontal boundary line 603 the position of which are determined by the control point 604. Namely, a position of the vertical boundary line 602 and a position of the horizontal boundary line 603 in a preview image are determined by the control point 604. As a result, the user easily determines positions of boundary lines in a preview image without the need to operate a plurality of control points.

Moreover, according to the first embodiment described above, one control point 604 is provided for the display area 601. As a result, the user easily determines positions of boundary lines in a preview image by simply operating one control point.

Furthermore, according to the first embodiment described above, when the control point 604 lies inside the preview image 615, the preview image 615 is divided into the four split areas 605 to 608 based on the two boundary lines, that is, the vertical boundary line 602 and the horizontal boundary line 603 crossing each other at the control point 604. One of split areas adjacent to each other in the preview image 615 is comprised of a partial image of the first image 401, and the other one is comprised of a partial image of the second image 501. As a result, the user easily compares the first image processing result and the second image processing result to each other in one preview image.

In the first embodiment described above, when the control point 604 lies on any of four sides forming an area of a preview image, for example, the lower side 900, the preview image 901 is divided into the two split areas 605 and 608 based on the vertical boundary line 602. In the preview image 901, the split area 605 is comprised of the partial image 902 of the first image 401, and the split area 608 is comprised of the partial image 903 of the second image 501. As a result, the user easily determines recognizes a difference between detailed parts of the first image 401 and the second image 501 by simply operating the one control point 604.

Figure 9:
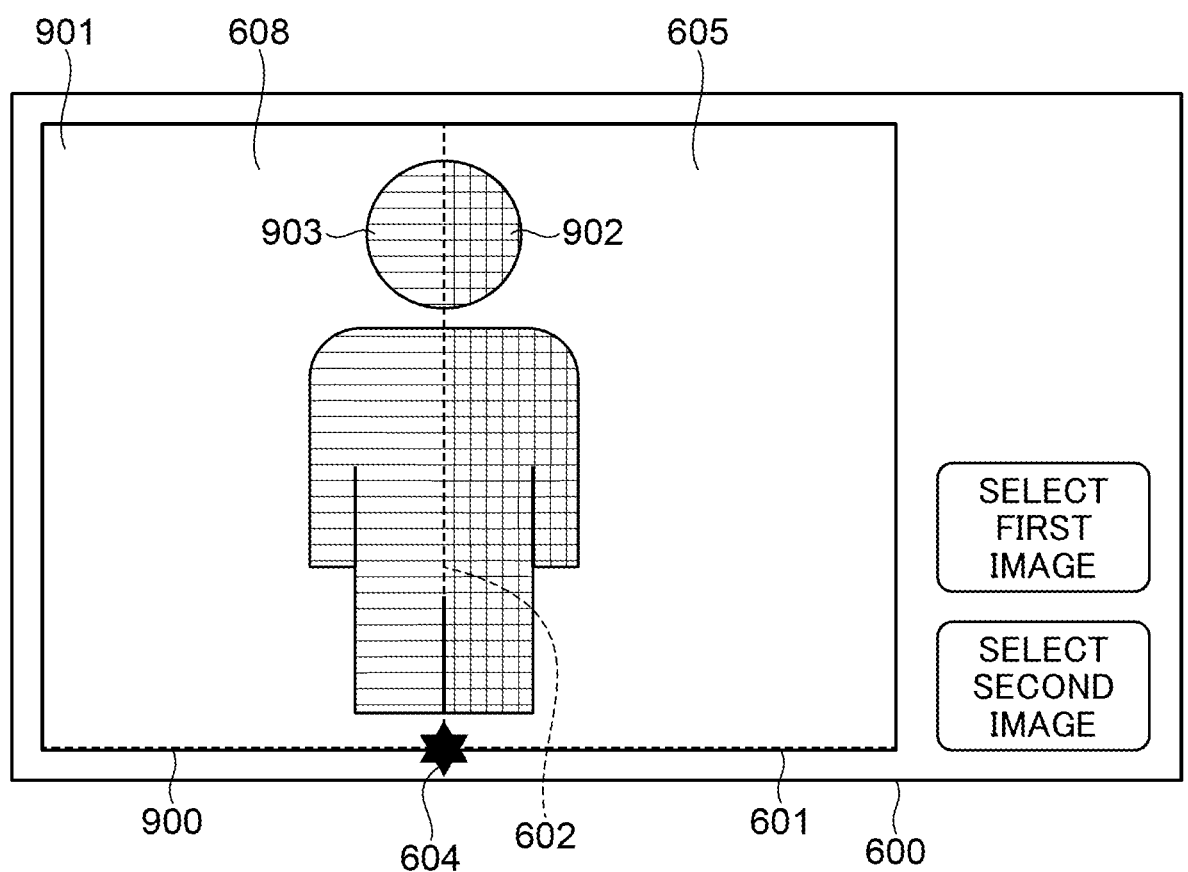
FIG. 9 is a view showing the preview screen in a case where the control point lies on a lower side that forms the preview area.
Figure 10:
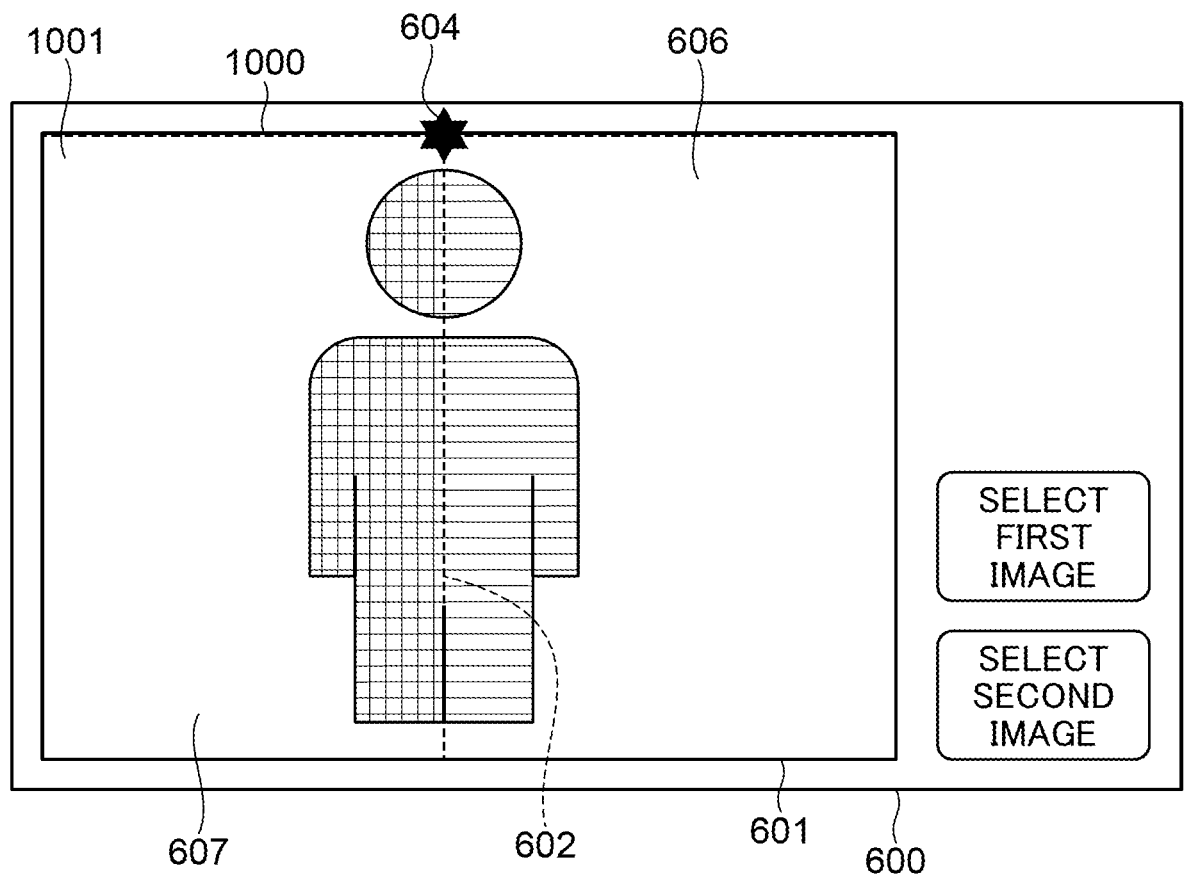
FIG. 10 is a view showing the preview screen in a case where the control point lies on an upper side that forms the preview area.

Moreover, in the first embodiment described above, when the control point 604 has moved from the lower side 900 to the upper side 1000, partial images constituting a preview image are switched (see, for example, FIGS. 9 and 10). As a result, the user easily switches partial images by simply moving the control point 604 to an opposite side.

In the first embodiment described above, when the control point 604 lies on any of the four corners forming the display area 601, for example, the upper left corner 1101, the preview image 1102 is comprised of the second image 501. As a result, the user easily switches a preview image from a composite image comprised of partial images of the first image 401 and the second image 501 to the second mage 501 by simply operating the one control point 604.

Moreover, in the first embodiment described above, when the control point 604 has moved from the upper left corner 1101 to either of the upper right corner 1301 and the lower left corner 1401 sharing the sides with the upper left corner 1101, the preview image 1302 or 1402 is displayed in the display area 601 with the second image 501 switched to the first image 401. As a result, the user easily compares the whole first image 401 and the whole second image 501 with each other.

In the first embodiment described above, since the control point 604 moves in such a manner as to follow a sliding operation performed by the user, the user can operate the control point 604 in an intuitive manner.

Moreover, in the first embodiment described above, since the control point 604 moves to a position at which a touch operation performed by the user has been detected, the user can move the control point 604 to a desired position without the need to select the control point 604.

Furthermore, in the first embodiment described above, since the user is notified of the operating guide to the control point 604, a situation in which the user has trouble operating the control point 604 is avoided.

It should be noted that on the preview screen 600, partial images of respective split areas may be switched when a predetermined operation such as a touch operation performed by the user has been detected even if the control point 604 has not been moved to an opposite side. Namely, even if the control point 604 is not moved to an opposite side, the preview image 901 in FIG. 9 may be switched to, for example, the preview image 1001 in FIG. 10. As a result, the partial images can easily be switched without moving the control point 604.

Moreover, on the preview screen 600, the user may be prompted to select images that will be assigned to split areas selected by the user. As a result, a desired image can be displayed in the display area 601 without moving the control point 604.

Although in the description of the first embodiment described above, it is assumed that the one control point 604 is displayed in the display area 601, the number of control points 604 should not always be one. For example, the control points 604 that correspond to respective choices on the original reading instruction screen 301 may be displayed in the display area 601. In this case, for example, a position of a boundary line between a processing result image subjected to one selected type of image processing and an initial image is determined in a preview image by one of the control points 604. Further, a position of a boundary line between another processing result image subjected to another selected type of image processing and the initial image is determined in the preview image by another one of the control points 604. As a result, images prior to and subsequent to multiple types of image processing can be seen in one preview image.

Moreover, although in the first embodiment described above, it is assumed that two buttons are selected from among the no image processing button 302 and the selection buttons 303 to 310 on the image reading instruction screen 301, the number of buttons selectable on the image reading instruction screen 301 should not always be two. For example, the same number of buttons as the maximum number of areas split from the display area 601 with the control point 604, that is, four buttons may be selectable on the image reading instruction screen 301. In this case, in a preview image, the split areas 605 to 608 are comprised of partial images of processing result images subjected to processes corresponding to the respective selected buttons. As a result, processing results of multiple types of image processing with different parameters such as a correction amount for color correction can be seen in one preview image.

A description will now be given of a second embodiment. The second embodiment is basically the same as the first embodiment described above in terms of constructions and operations, and features of the construction and operation that are the same as in the first embodiment will thus not be described, only features different from those of the first embodiment being described below.

Figure 15:
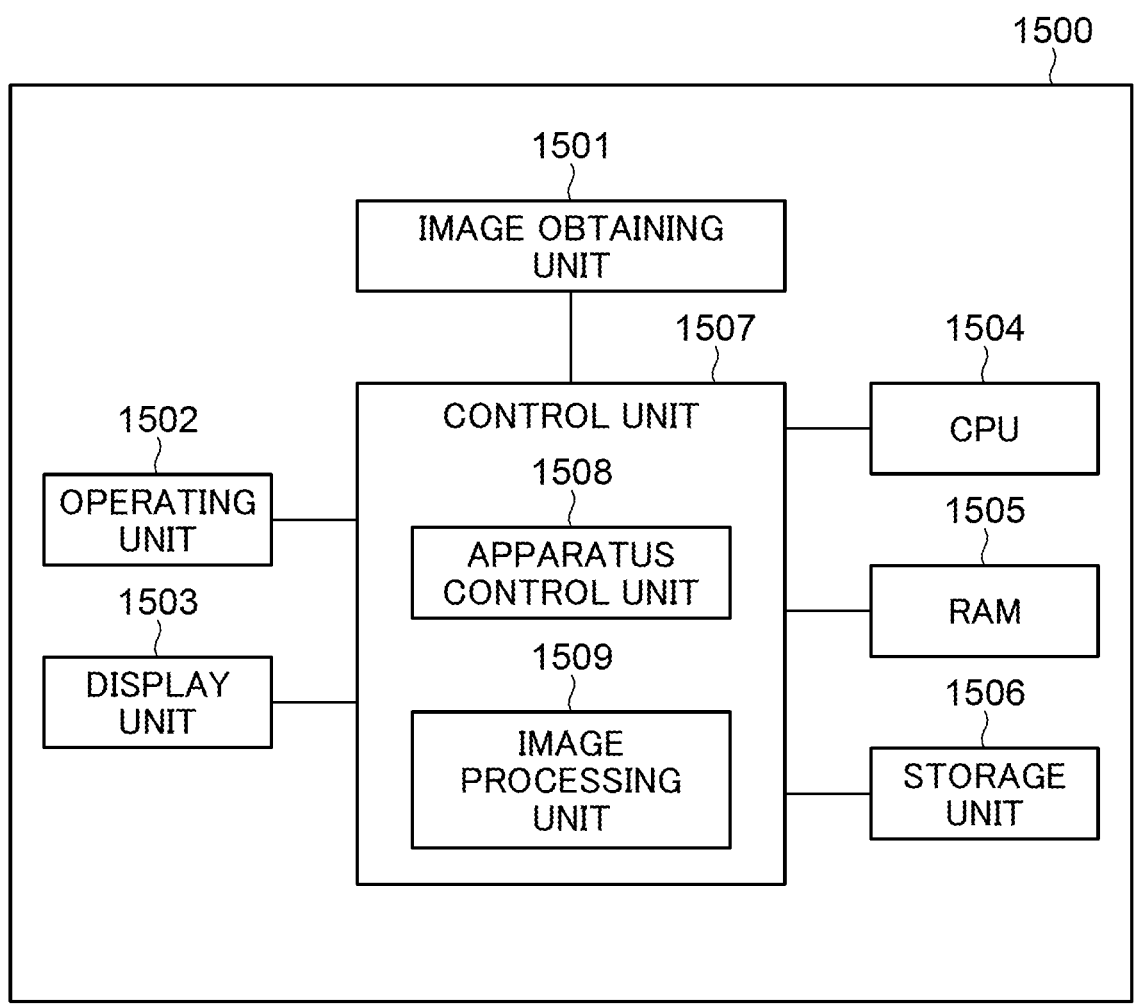
FIG. 15 is a block diagram schematically showing an arrangement of a mobile terminal which is a display control apparatus according to a second embodiment of the present invention.

FIG. 15 is a block diagram schematically showing an arrangement of a mobile terminal 1500 which is a display control apparatus according to the second embodiment of the present invention.

Referring to FIG. 15, the mobile terminal 1500 has an image obtaining unit 1501, an operating unit 1502, a display unit 1503, a CPU 1504, a RAM 1505, a storage unit 1506, and a control unit 1507. The control unit 1507 is connected to the image obtaining unit 1501, the operating unit 1502, the display unit 1503, the CPU 1504, the RAM 1505, and the storage unit 1506. The control unit 1507 has an apparatus control unit 1508 and an image processing unit 1509.

The mobile terminal 1500 is a smartphone, a tablet terminal, or the like. The mobile terminal 1500 stores an image, which is obtained by shooting with the image obtaining unit 1501, in the storage unit 1506, and subjects the stored image to different types of image processing. The mobile terminal 1500 displays an image processing result as a preview image. The image obtaining unit 1501 is comprised of, for example, a camera (not shown) and obtains an image in an image data format by shooting a subject. The control unit 1507 obtains the image from the image obtaining unit 1501 and stores the image in the storage unit 1506. The operating unit 1502 and the display unit 1503 constitute, for example, a touch display in which the operating unit 1502 which is a touch panel is layered on the top of the display unit 1503 which is a display. Information on a user operation received by the operating unit 1502 is transferred to the control unit 1507 and reflected on an operation of the mobile terminal 1500 by the apparatus control unit 1508. What is displayed on the display unit 1503 is changed in accordance with the operational information on the user operation received by the operating unit 1502. To change what is displayed on the display unit 1503, the image processing unit 1509 generates display data and also transfers the display data to the display unit 1503. The display unit 1503 displays the received data. The CPU 1504 reads a main program from the storage unit 1506 in accordance with an initial program stored in the storage unit 1506 and stores the main program in the RAM 1505. The RAM 1505 is used as a program storage area and also used as a work area.

Figure 16:
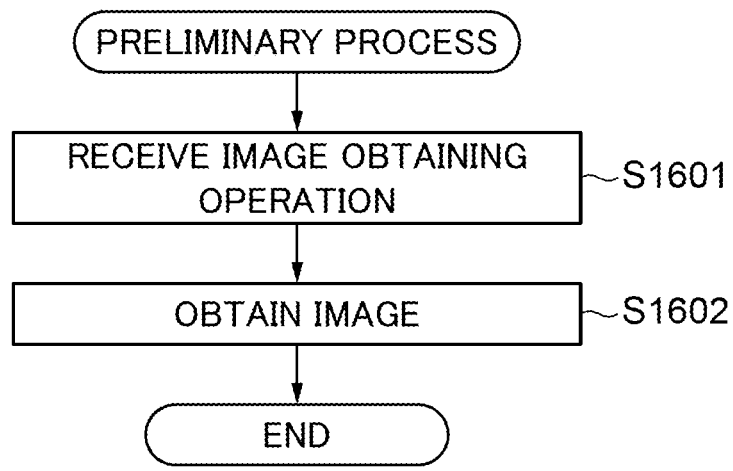
FIG. 16 is a flowchart showing the procedure of a preliminary process which is carried out by a control unit in FIG. 15.

FIG. 16 is a flowchart showing the procedure of a preliminary process which is carried out by the control unit 1507 in FIG. 15. The process in FIG. 16 is implemented by the CPU 1504 executing programs expanded from the storage unit 1506 into the RAM 1505. The process in FIG. 16 is carried out when a camera starting instruction given by the user is received via the operating unit 1502.

Referring to FIG. 16, first, upon receiving an image obtaining operation via the operating unit 1502 (step S1601), the control unit 1507 starts the image obtaining unit 1501. The control unit 1507 obtains an image by causing the image obtaining unit 1501 to shoot a subject (step S1602). The image thus obtained (hereafter referred to as "the obtained image") is stored in the storage unit 1506. After that, the control unit 1507 ends the present process.

Figure 17:
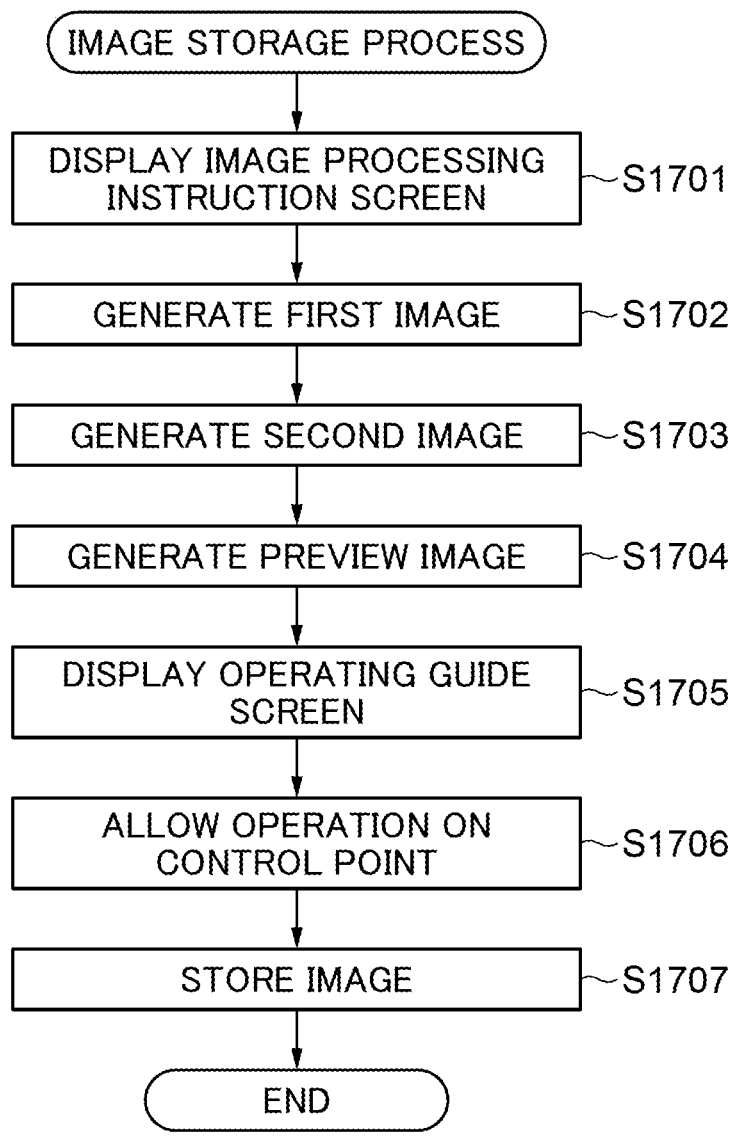
FIG. 17 is a flowchart showing the procedure of an image storage process which is carried out by the control unit in FIG. 15.

FIG. 17 is a flowchart showing the procedure of an image storage process which is carried out by the control unit 1507 in FIG. 15. The process in FIG. 17 is implemented by the CPU 1504 executing programs expanded from the storage unit 1506 into the RAM 1505. The process in FIG. 17 is carried out when an image processing preparation instruction given by the user is received via the operating unit 1502.

Figure 18:
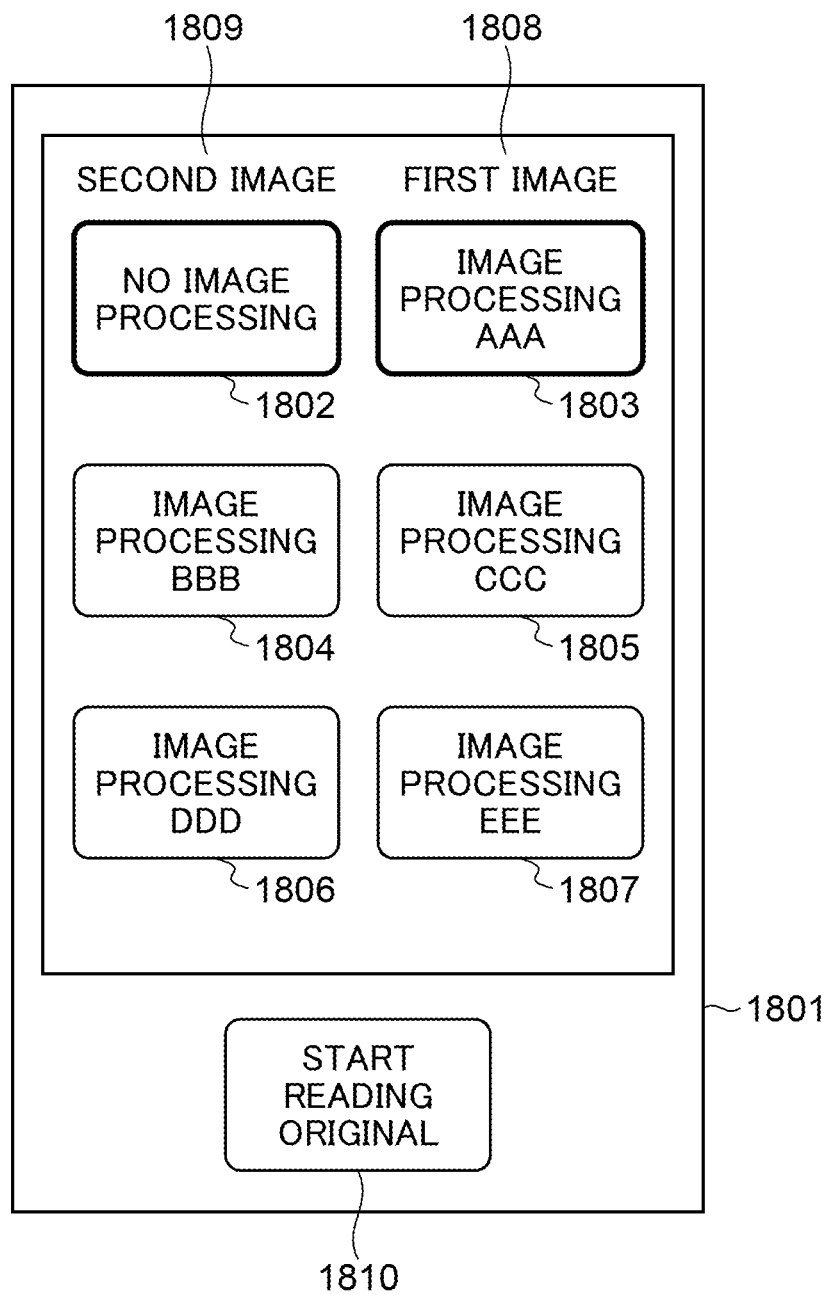
FIG. 18 is a view showing an example of an image processing instruction screen which is displayed on a display unit in FIG. 15.

Referring to FIG. 17, first, the control unit 1507 causes the display unit 1503 to display an image processing instruction screen 1801 in FIG. 18 for giving an instruction to start image processing (step S1701). The image processing instruction screen 1801 has a no image processing button 1802, at least one, for example, five selection buttons 1803 to 1807, and a start button 1810. When the no image processing button 1802 is selected, a setting that will not perform image processing is made in the mobile terminal 1500. The selection buttons 1803 to 1807 correspond to different types of image processing with different parameters. When any of the selection buttons 1803 to 1807 is selected, a setting that will perform image processing corresponding to the selected button is made in the mobile terminal 1500.

When one of the no image processing button 1802 and the selection buttons 1803 to 1807 is selected on the image processing instruction screen 1801, the operating unit 1502 receives this selection as a first image processing selecting operation performed by the user. The operating unit 1502 informs the control unit 1507 to that effect and marks the selected button with a sign 1808 indicating that the first image processing is selected. Then, when one of the no image processing button 1802 and the selection buttons 1803 to 1807 except the button selected for the first image processing is selected on the image processing instruction screen 1801, the operating unit 1502 receives this selection as a second image processing selecting operation performed by the user. The operating unit 1502 informs the control unit 1507 to that effect and marks the selected button with a mark 1809 indicating that the second image processing is selected. After that, when the start button 1810 is selected on the image processing instruction screen 1801, the operating unit 1502 informs the control unit 1507 that an image processing starting instruction has been received. When the start button 1810 is selected on the image processing instruction screen 1801 with the first image processing or the second image processing unselected, the operating unit 1502 automatically selects image processing corresponding to the first image processing or the second image processing from among the no image processing button 1802 and the selection buttons 1803 to 1807.

Figure 19:
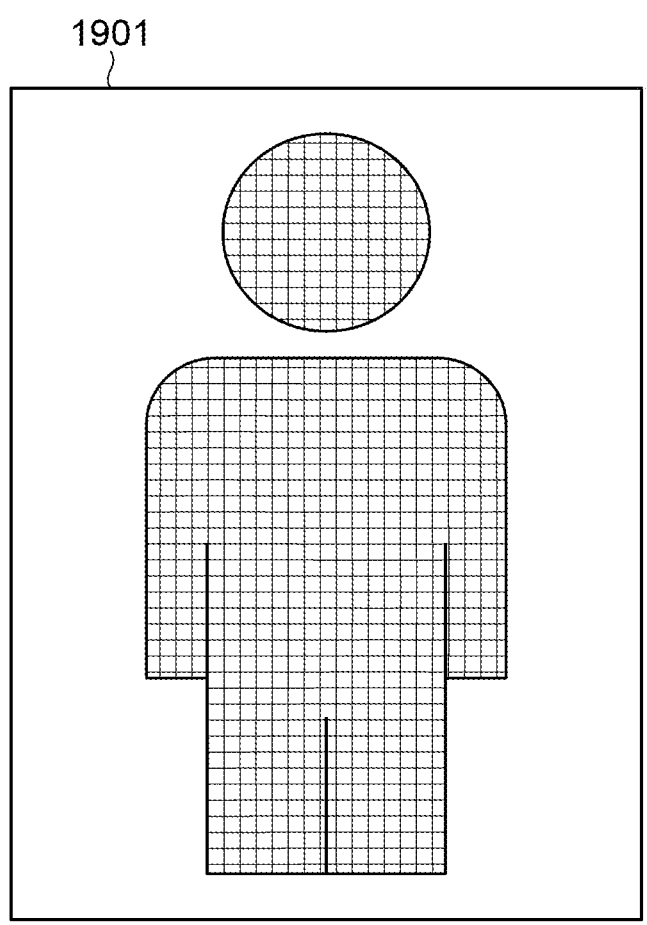
FIG. 19 is a view showing an example of a first image which is generated by the mobile terminal in FIG. 15.
Figure 20:
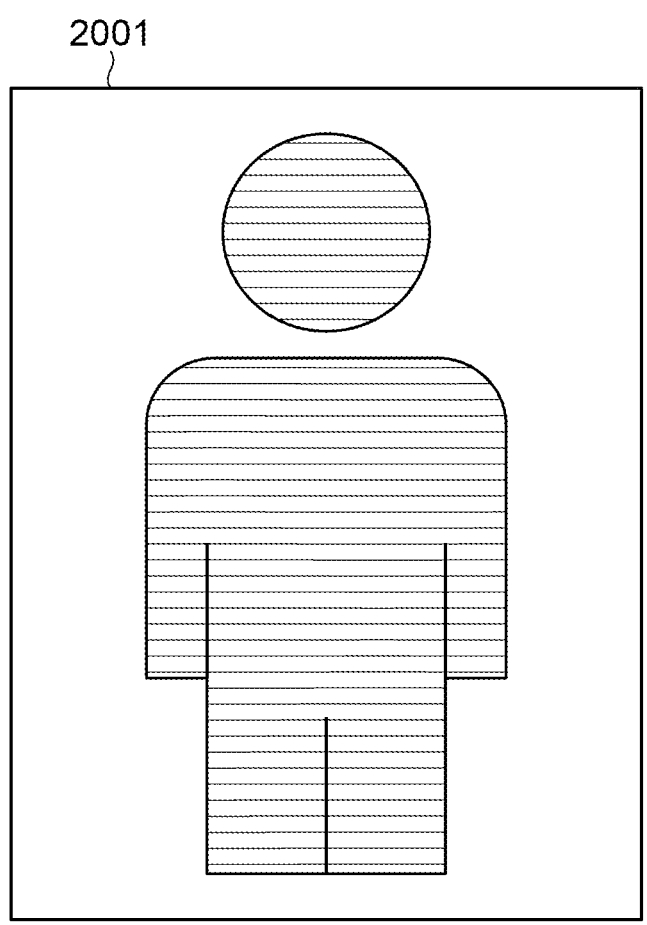
FIG. 20 is a view showing an example of a second image which is generated by the mobile terminal in FIG. 15.

The control unit 1507 then transfers the obtained image stored in the process in FIG. 16 described above from the storage unit 1506 to the image processing unit 1509. The control unit 1507 then causes the image processing unit 1509 to subject the obtained image to processing corresponding to the button marked with the sign 1808 as with the process in the step S204 described above to generate a first image 1901 in FIG. 19 (step S1702). The first image 1901 is stored in the storage unit 1506. The control unit 1507 then causes the image processing unit 1509 to subject the obtained image to processing corresponding to the button marked with the sign 1809 as with the step S205 described above to generate a second image 2001 in FIG. 20 (step S1703). The second image 2001 is also stored in the storage unit 1506.

Figure 21:
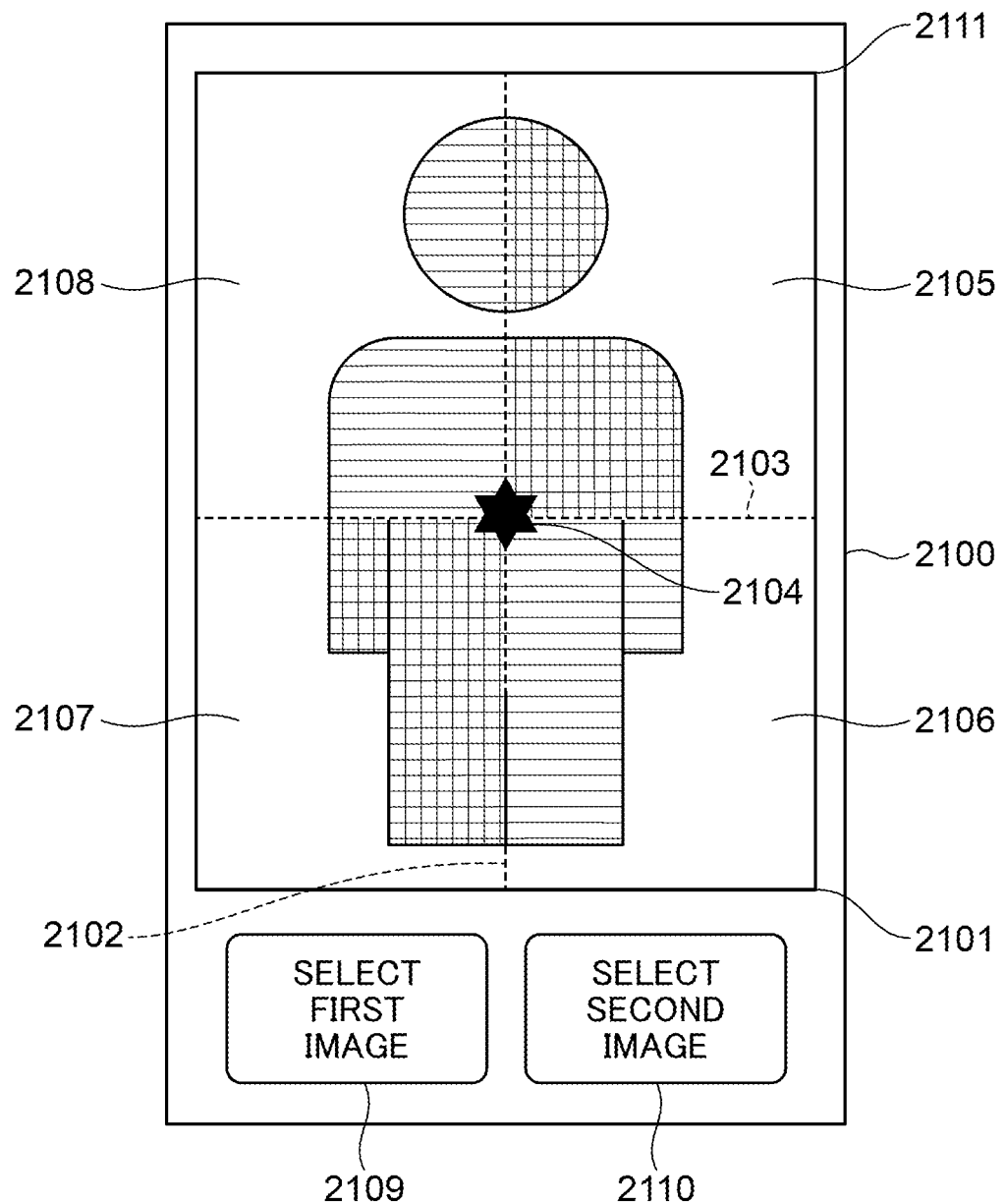
FIG. 21 is a view showing an example of a preview screen which is displayed on the display unit in FIG. 15.

The control unit 1507 then transfers the first image 1901 and the second image 2001 to the image processing unit 1509. Based on the first image 1901 and the second image 2001, the control unit 1507 causes the image processing unit 1509 to generate a preview image 2111 in FIG. 21 (step S1704). The preview image 2111 is transferred to the display unit 1503. The display unit 1503 displays a preview screen 2100 in FIG. 21 based on the preview image 2111. The preview screen 2100 has a display area 2101, which is for displaying the preview image 2111, and selection buttons 2109 and 2110. When the selection button 2109 is selected, a setting that will store the first image 1901 in the storage unit 1506 is made in the mobile terminal 1500. When the selection button 2110 is selected, a setting that will store the second image 2001 in the storage unit 1506 is made in the mobile terminal 1500.

The preview image 2111 is a composite image of the first image 1901 and the second image 2001. As with the first embodiment described above, one control point 2104 for determining positions of a vertical boundary line 2102 and a horizontal boundary line 2103 is displayed in the display area 2101 where the preview image 2111 is displayed. It should be noted that in the mobile terminal 1500, a calibration of position coordinates of the preview image 2111 and position coordinates of the display area 2101 is also performed in advance based on an initial position of the control point 2104. The vertical boundary line 2102 is a straight line along a vertical direction of the display area 2101. The horizontal boundary line 2103 is a straight line along a horizontal direction of the display area 2101. The vertical boundary line 2102 and the horizontal boundary line 2103 are orthogonal to each other at the control point 2104. The preview image 2111 is divided into four split areas 2105 to 2108 by the vertical boundary line 2102 and the horizontal boundary line 2103 the positions of which are determined based on the control point 2104. Either of the first image 1901 and the second image 2001 is assigned to each of the split areas 2105 to 2108, and different images are assigned to the adjoining split areas. In the preview image 2111, the split areas 2105 to 2108 are comprised of partial images of images assigned to them.

Then, the control unit 1507 causes the image processing unit 1509 to generate an operating guide screen for the control point 2104 in the same manner as in the step S207 and displays the operating guide screen on the display unit 1503 (step S1705). The control unit 1507 then allows the user to operate the control point 2104 on the preview screen 2100 (step S1706). Then, when either of the selection buttons 2109 and 2110 is selected on the preview screen 2100, the control unit 1507 stores an image corresponding to the selected button in the storage unit 1506 (step S1707) and ends the present process.

As described above, the present invention is also applicable to the mobile terminal 1500 equipped with the image obtaining unit 1501 capable of obtaining an image by shooting a subject, and the same effects as those in the first embodiment are obtained.

Although in the above description of the embodiments, it is assumed that the present invention is applied to the MFP and the mobile terminal which are the display control apparatuses, the present invention should not always be applied to the MFP and the mobile terminal. For example, the present invention may be applied to apparatuses such as a PC capable of obtaining the first image and the second image described above from the external apparatus and carrying out the processes in the step S1704 in FIG. 17 and the subsequent steps.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-248383, filed Dec. 25, 2017, which is hereby incorporated by reference herein in its entirety.

What is claimed is:

1. A display control apparatus configured to display a preview image based on processing results of image processing performed on an initial image, the display control apparatus comprising:
a non-transitory computer-readable storage medium storing a program; and
a data processing unit communicatively connected to the non-transitory computer-readable storage medium and configured at least by the program at least to:
generate a first image based on the initial image or based on a processing result of first image processing performed on the initial image;
generate a second image based on a processing result of second image processing performed on the initial image;
control display of the preview image based on the first image and the second image;
receive an operation performed by a user on a control point; and
control display of the preview image to be divided into four split areas based on two boundary lines crossing each other at the control point, a first split area of the four split areas in the preview image being comprised of a part of the first image, and a second split area of the four split areas in the preview image being comprised of a part of the second image, the first split area adjacent the second split area.

2. The display control apparatus according to claim 1, wherein a number of control points provided for the preview image is one.

3. The display control apparatus according to claim 2, wherein, in a case where the control point lies inside an area of the preview image, the data processing unit is configured at least by the program at least to control the display of the preview image to be divided into the four split areas based on the two boundary lines crossing each other at the control point, the first split area of the four split areas in the preview image being comprised of the part of the first image, and the second split area of the four split areas in the preview image being comprised of the part of the second image, the first split area adjacent the second split area.

4. The display control apparatus according to claim 2, wherein, in a case where the control point lies on one side of four sides forming an area of the preview image, the data processing unit is configured at least by the program at least to control display of the preview image to be divided into two split areas based on a boundary line that is determined by the control point and is orthogonal to the one side, one split area of the two split areas in the preview image being comprised of a part of the first image, and the other split area of the two split areas being comprised of a part of the second image.

5. The display control apparatus according to claim 4, wherein, in a case where the control point has moved from the one side to a side of the four sides that is opposite the one side, the data processing unit is configured at least by the program at least to control display of images constituting the two split areas in the preview image to be switched.

6. The display control apparatus according to claim 3, wherein, in a case where a predetermined operation on the preview image by the user is received, the data processing unit is configured at least by the program at least to control display of images constituting the four split areas in the preview image to be switched.

7. The display control apparatus according to claim 2, wherein the data processing unit is configured at least by the program at least to prompt the user to select images constituting split areas selected by the user.

8. The display control apparatus according to claim 2, wherein, in a case where the control point lies on one of four corners forming an area of the preview image, the data processing unit is configured at least by the program at least to control display of the preview image to be comprised of the first image.

9. The display control apparatus according to claim 8, wherein, in a case where the control point moves from the one corner of the four corners to another one corner of the four corners which shares a side with the one corner of the four corners in the area of the preview image, the data processing unit is configured at least by the program at least to control display of the preview image to switch from the first image to the second image.

10. The display control apparatus according to claim 1, wherein the data processing unit is configured at least by the program at least to receive operations performed by the user on the control point for each of the first image processing and the second image processing.

11. The display control apparatus according to claim 3, wherein the data processing unit is configured at least by the program at least to:
generate a third image based on a processing result of third image processing performed on the initial image;
generate a fourth image based on a processing result of fourth image processing performed on the initial image; and
control display of the preview image to be comprised of a part of the first image, a part of the second image, a part of the third image, and a part of the fourth image.

12. The display control apparatus according to claim 1, wherein the data processing unit is configured at least by the program at least to control movement of the control point in such a manner as to follow a sliding operation performed by the user.

13. The display control apparatus according to claim 1, wherein the data processing unit is configured at least by the program at least to control movement of the control point to a position at which a touch operation performed by the user has been detected.

14. The display control apparatus according to claim 1, the data processing unit is configured at least by the program at least to provide notification of an operating guide for the control point.

15. A control method for a display control apparatus that displays a preview image based on processing results of image processing performed on an initial image, the control method for the display control apparatus comprising:
   generating a first image based on the initial image or based on a processing result of first image processing performed on the initial image;
   generating a second image based on a processing result of second image processing performed on the initial image;
   controlling display of the preview image based on the first image and the second image; and
   receiving an operation performed by a user on a control point,
   wherein the preview image is divided into four split areas based on two boundary lines crossing each other at the control point, a first split area of the four split areas in the preview image being comprised of a part of the first image, and a second split area of the four split areas in the preview image being comprised of a part of the second image, the first split area adjacent the second split area.

16. A non-transitory computer-readable storage medium storing a program for causing a computer to execute a control method for a display control apparatus that displays a preview image based on processing results of image processing performed on an initial image, the control method for the display control apparatus comprising:
   generating a first image based on the initial image or based on a processing result of first image processing performed on the initial image;
   generating a second image based on a processing result of second image processing performed on the initial image;
   controlling display of the preview image based on the first image and the second image; and
   receiving an operation performed by a user on a control point,
   wherein the preview image is divided into four split areas based on two boundary lines crossing each other at the control point, a first split area of the four split areas in the preview image being comprised of a part of the first image, and a second split area of the four split areas in the preview image being comprised of a part of the second image, the first split area adjacent the second split area.

* * * * *